Aug. 28, 1951
H. A. GARDNER
2,566,185
LAMP TUBE FOR PROJECTOR DEVICES FORMED FROM TWO
IDENTICAL CHANNEL-SHAPED MEMBERS
Filed March 8, 1947
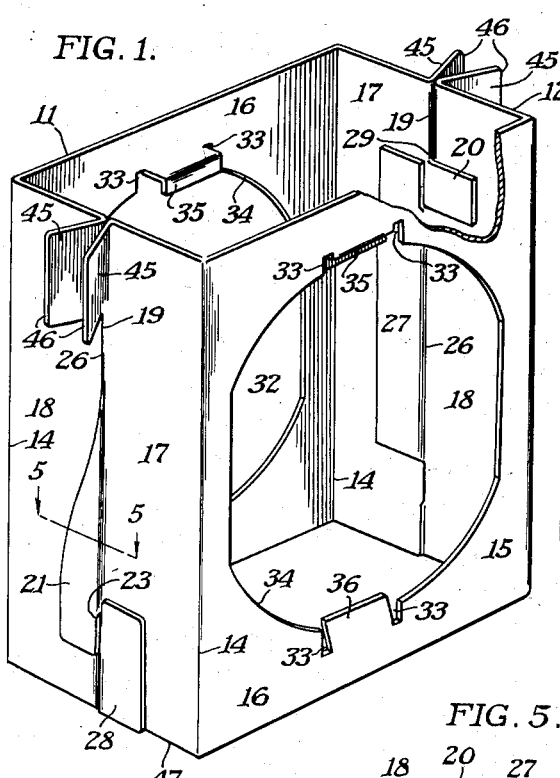
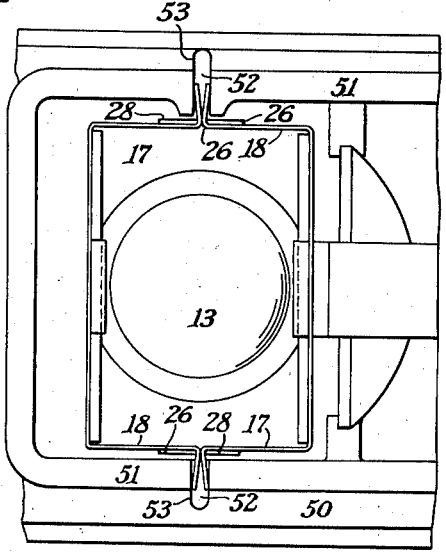
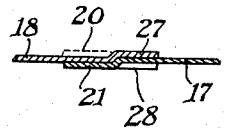
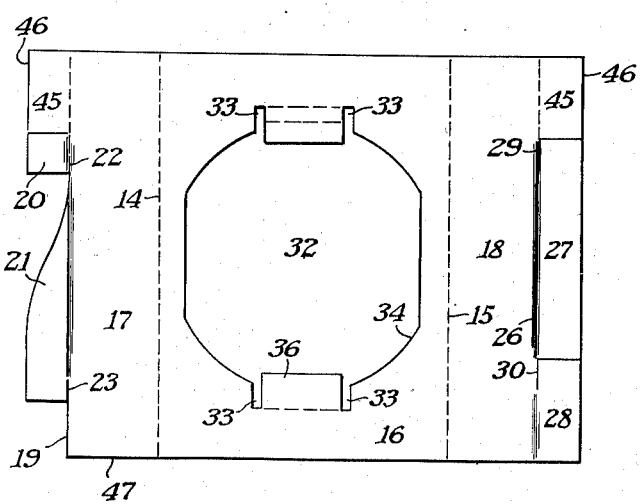
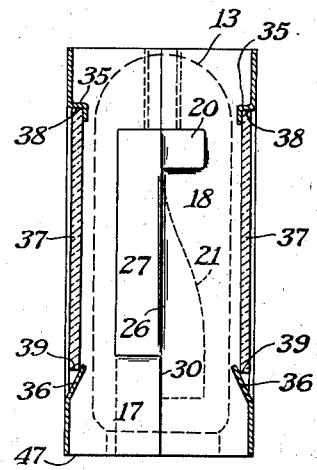
HAROLD A. GARDNER
INVENTOR
BY *(signatures)*
ATTORNEYS Patented Aug. 28, 1951

2,566,185

UNITED STATES PATENT OFFICE 2,566,185

LAMP TUBE FOR PROJECTOR DEVICES FORMED FROM TWO IDENTICAL CHANNEL-SHAPED MEMBERS

Harold A. Gardner, Rochester, N. Y., assignor to Eastman Kodak Company, Rochester, N. Y., a corporation of New Jersey Application March 8, 1947, Serial No. 733,366

6 Claims. (Cl. 240—11)

1

The present invention relates to an optical apparatus, and more particularly to a lamp tube therefor.

The principal object of the invention is the provision of a lamp tube formed from two identically shaped members which, when assembled, form a tube in which an electric lamp may be positioned.

Another object of the invention is the provision of a lamp tube, the parts of which are formed from sheet material.

Yet another object of the invention is the provision of a device of the class described, the parts of which are held detachably in assembled relation by holding means integral with the parts.

And another object of the invention is the provision of a lamp tube of few parts of rugged construction which may be quickly and easily assembled to form a rigid structure.

To these and other ends, the invention resides in certain improvements and combinations of parts, all as will be hereinafter more fully described, the novel features being pointed out in the claims at the end of the specification.

In the drawings:

Fig. 1 is a perspective view of a lamp tube constructed in accordance with the present invention, showing the relation of the various parts;

Fig. 2 is a plan view of the tube illustrated in Fig. 1 with the tube in position in an optical apparatus, showing the arrangement for positioning and suspending the tube;

Fig. 3 is a view of one of the tube members before bending into channel form;

Fig. 4 is a vertical sectional view through the assembled tube shown in Fig. 1, showing the arrangement for supporting heat-resisting screens on the lamp tube; and Fig. 5 is a horizontal sectional view through the side of the lamp tube and taken substantially in line with 5—5 of Fig. 1 showing the overlapping relation of the holding and connecting lugs.

Similar reference numerals through the various views indicate the same parts.

Fig. 1 shows a lamp tube formed from a pair of identical channel-shaped members, broadly designated by the numerals 11 and 12, which are assembled in the relation shown in Fig. 1, and in a manner to be later described, to provide a lamp tube in which a lamp 13 is adapted to be positioned. As the members 11 and 12 are identical in construction, only one will be described in detail and corresponding parts in the other member will be designated by the same numerals.

Each member is formed from a strip of sheet material, preferably light-gauge metal, which, when folded on lines 14 and 15, provides a channel-shaped member, Fig. 1, having a bottom 16 and opposite side walls 17 and 18. The left edge 19 of the strip, or the upper edge of the wall 17 when the latter is folded on line 14, has projecting therefrom a pair of lugs 20 and 21 of the shape as shown in Fig. 3. These lugs are formed with slots or cuts 22 and 23 respectively in alignment with the edge 19 for a purpose to be later described. To permit easy assembly of the members 11 and 12, as will be later described, the lugs 20 and 21 are bent in alignment with the edge 19, as shown by the shaded line, so that the lug 20 lies slightly below the plane of the sheet, as shown in Fig. 3, while the lug 21 lies slightly above the plane of the sheet. Thus the lugs 20 and 21 are out of registry with the plane of the wall 17 and spaced slightly from opposite faces thereof, as is apparent.

The opposite side edge 26 of the sheet, or the top edge of wall 18 when the latter is folded on line 15, has projecting therefrom and formed integral therewith a long lug 27 substantially equal in length to the lug 21, and a lower lug 28. These lugs are formed with cuts or slots 29 and 30 respectively and arranged in alignment with the edge 26, as clearly illustrated in Fig. 3. The lugs 27 and 28 are bent along edge 26 so that the lug 27 lies slightly below the plane of the sheet, Fig. 3, while the lug 28 lies slightly above the plane of the sheet. This offset relation of the lugs is shown in Fig. 5.

The bottoms 16 of the channel-shaped members 11 and 12 are spaced, as shown in Fig. 1, and have aligned openings or apertures 32 through which light rays from the lamp 13 may pass, as is apparent. Spaced slots 33 extend radially from the edge 34 of each light aperture 32 to form a pair of tongue-like sections 35 and 36 adapted to be bent inwardly as shown in Fig. 4 to hold the light screen 37. To secure this result each tongue 35 is bent to the shape as shown in Fig. 4 to receive the upper edge 38 of the screen 37 while the lower tongue 36 is bent inwardly, as shown in Fig. 4, to engage only the inner lower edge 39 of the screen to yieldably retain the screen in position over the aperture 32.

In addition to the lugs 20, 21, 27 and 28, the upper ends of the edges 19 and 26 have projecting therefrom ears or fingers 45 which are bent along edges 19 and 26 to extend laterally from the sides 17 and 18 and with the free ends 46 of the fingers spread apart, as best shown in Fig. 1.

Thus, the light tube is formed from two sheets of light-gauge metal, each of which is stamped, punched or otherwise acted upon to provide a sheet of the form shown in Fig. 3. During this forming operation, the lugs 20, 21, 27 and 28, and the fingers 45 may be bent in the manner above described. The sheets are then separately folded or bent on lines 14 and 15 to provide the two identical channel-shaped members 11 and 12. The parts are assembled by positioning one member, say member 11, as shown in Fig. 1, with the side 18 toward the observer and the edges 19 and 26 to the right. The member 12 is then arranged with the side 17 toward the observer and the edges 19 and 26 thereof to the left. With the members 11 and 12 in this general position, the members are moved toward each other with the lug 20 of the member 12 sliding under the side 18 of the member 11, and the lug 21 of the member 12 sliding over the lug 27 of the member 11. The member 12 is then moved downwardly until the slots 22 and 23 slide into the slots 29 and 30 to the position shown in Fig. 1. In this position, the lugs 20 and 27 are inside the tube and lie substantially in a plane, while the lugs 21 and 28 are on the outside of the tubes and spaced from the surface thereof and lie substantially in a plane, as shown in Fig. 5. The lug arrangement on the right side of the tube, Fig. 1, is identical to that above described, and shown in part in Fig. 1. By means of this lug and slot arrangement, the members 11 and 12 may be readily and easy assembled.

Referring now to Fig. 1, it will be apparent that if the lower left edge 47 of the wall 17 of the member 12 is pushed upwardly, it will reverse the above-described assembling operation and the lugs on the left side of the tube will be moved out of interlocking relation. However, on the right side of the member 12, the lug 28 thereof is positioned below the lug 21 of the member 12 so that any tendency to move member 12 upwardly will cause lug 28 thereof to engage lug 21 of member 11 to lock the members more tightly. Also a downward movement of the member 11 will serve to separate the lugs 21 and 28 on the left side of the tube but will force the lugs 21 and 28 on the right side into tighter locking engagement. Thus by having the lugs on opposite sides in reverse relation, both sides of the tube cannot be disconnected simultaneously, the advantage of which will be apparent.

The above-described lamp tube is designed for use in an optical apparatus such as a projection viewer which is formed with a base 50 which may be of any suitable shape or material to support a lamp 13 and other suitable optical members, not shown. The base is provided with a pair of parallel rails or walls 51 which are spaced a distance slightly greater than the width of the main body of the lamp tube, as shown in Fig. 2. These rails are formed in aligned openings 52. Normally the fingers 46 are spread, as shown in Fig. 1. However, when the tube is assembled on the base, the fingers 45 are pressed together and inserted in slots 52 so that the fingers will yieldably engage the edges 53 of the slots to accurately position the tube on the base to surround the lamp 13, as shown in Fig. 4. Also the engagement of the fingers 45 and slots 52 secure the lamp tube in a suspended relation from the rails 51.

The above-described invention thus provides a novel lamp tube formed from a pair of identical-shaped members which may be readily assembled to form a rigid structure. When the lamp tube is mounted on the projector or similar apparatus, cooperating parts on the tube and the apparatus serve to position the tube and support the latter in suspended relation.

The lamp tube surrounds the lamp and may absorb the heat dissipated by the lamp and not used in projection. Furthermore the lamp tube forms an effective chimney which will cause air to flow upwardly through the tube and over the lamp to cool the latter. Also the tube cuts down stray light from the lamp. In order that the tube may rapidly radiate the heat absorbed thereby, it is painted black, as is common practice. By arranging the tube in suspended relation, the tube may be placed in position without interfering with the lamp assembly.

While one embodiment of the invention has been disclosed, it is to be understood that the inventive idea may be carried out in a number of ways. This application is, therefore, not to be limited to the precise details described, but is intended to cover all variations and modifications formed within the scope of the claims.

I claim:

1. A lamp tube comprising, in combination, a pair of identical channel-shaped members each of which is formed with a bottom and opposite sides, opposite pairs of vertical edges of said sides being arranged in abutting relation to position said sides in alignment to provide a tube in which a lamp is adapted to be arranged and spaced from said bottom and sides, and lugs on each of said edges cooperating with lugs on an abutting edge to hold the members in assembled relation, the lugs on one member being identical to those on the other member and the lugs on each edge being bent out of the plane of its side so as to overlie opposite faces of the abutting side and in alignment with the cooperating lugs.

2. A lamp tube comprising, in combination, a pair of identical channel-shaped members each of which is formed with a bottom and opposite sides, opposite pairs of vertical edges of said sides being arranged in abutting relation to position said sides in alignment to provide a tube in which a lamp is adapted to be arranged and spaced from said bottom and sides, and a pair of lugs formed on each vertical edge and extending toward an abutting edge of the other side member, each of said lugs being formed with an open-end slot in alignment with the edge on which said lug is formed and cooperating with a slot formed in a cooperating lug on an abutting edge to interlock the lugs on abutting edges to hold the members in assembled relation.

3. A lamp tube comprising, in combination, a pair of identical channel-shaped members each of which is formed with a bottom and opposite sides, opposite pairs of vertical edges of said sides being arranged in abutting relation to position said sides in alignment to provide a tube in which a lamp is adapted to be arranged and spaced from said bottoms and sides, and a pair of lugs formed on each vertical edge and spaced vertically thereon and extending toward and overlapping an abutting edge of the other member to cooperate with a similar pair of lugs formed thereon, the lugs of each pair being bent in opposite directions out of the plane of the sides so as to overlie the opposite faces of the abutting side, each lug being formed with an open-end slot in alignment with the edge on which it is formed to receive a portion of the cooperating lug on the abutting edge to interlock the cooperating lugs to retain the members in assembled relation.

4. In an optical apparatus, the combination with a base formed with spaced walls having aligned slots, of a lamp tube associated with said base and positioned between said walls, said tube comprising a pair of identical channel-shaped members each having spaced sides, said sides being formed with interlocking lugs adapted to cooperate to retain the members in assembled relation, the lugs on corresponding parts of said members being identical in shape said tube having a width less than the distance between said sides, and laterally projecting parts formed from said sides and extending into said slots to positions said tube on said base.

5. In an optical apparatus, the combination with a base formed with spaced walls having aligned slots, of a lamp tube associated with said base and positioned between said walls, said tube comprising a pair of identical channel-shaped members each having spaced sides, said sides being formed with interlocking lugs adapted to cooperate to retain the members in assembled relation, said tube having a width less than the distance between said sides, and a pair of flexible fingers formed from said sides and projecting laterally from opposite sides of said tube and engaging edges of said slots to yieldably retain said fingers in said slots to support said tube in suspended relation on said base.

6. In an optical apparatus, the combination with a base formed with spaced walls having aligned slots, of a lamp tube associated with said base and positioned between said walls, said tube comprising a pair of identical channel-shaped members each of which is formed with a bottom and spaced sides, opposite pairs of edges of said sides being arranged in abutting relation to position said sides in alignment to provide a tube in which a lamp is adapted to be positioned, said bottoms being formed with aligned openings through which light rays from said lamp may pass, an upper and a lower lug formed on each edge, means for positioning said lugs in interlocking relation to retain said member in assembled relation to form the tube, and registering ears on the upper portions of said abutting edges and projecting laterally therefrom, said ears being spread so as to engage the sides of said slots to position said tube on said base and to suspend it therefrom.

HAROLD A. GARDNER.

REFERENCES CITED

The following references are of record in the file of this patent:

UNITED STATES PATENTS

| Number | Name | Date |
|---|---|---|
| 1,546,369 | deVry | July 21, 1925 |
| 1,954,252 | Maus et al. | Apr. 10, 1934 |
| 2,033,038 | Lee | Mar. 3, 1936 |
| 2,315,914 | Wengel | Apr. 6, 1943 |
| 2,401,598 | Wood | June 4, 1946 |

FOREIGN PATENTS

| Number | Country | Date |
|---|---|---|
| 361,691 | Germany | Oct. 17, 1922 |